United States Patent [19]

Yurgevich

[11] Patent Number: 5,398,956
[45] Date of Patent: Mar. 21, 1995

[54] VARIABLE HEIGHT GOOSENECK

[75] Inventor: Howard J. Yurgevich, Monticello, Ind.

[73] Assignee: Rosby Corporation, Monon, Ind.

[21] Appl. No.: 102,346

[22] Filed: Aug. 5, 1993

[51] Int. Cl.⁶ .................... B62D 21/09; B62D 21/10
[52] U.S. Cl. .................. 280/441.2; 280/425.2; 280/790; 410/94
[58] Field of Search ............... 280/425.1, 425.2, 441.2, 280/781, 789, 790, 799, DIG. 8; 296/26, 7; 105/370, 371, 372; 220/1.5; 410/94

[56] References Cited

U.S. PATENT DOCUMENTS

| | | | |
|---|---|---|---|
| 3,034,825 | 5/1962 | Harlander et al. | 220/1.5 X |
| 3,083,852 | 4/1963 | Lidstrom . | |
| 3,085,707 | 4/1963 | Tantlinger | 220/1.5 |
| 3,587,890 | 6/1971 | Hyland et al. | 280/789 X |
| 3,752,502 | 8/1973 | Ehler | 280/425.1 X |
| 3,861,716 | 1/1975 | Baxter et al. | 280/441.2 X |
| 4,092,050 | 3/1978 | Sobeck | 280/789 X |
| 4,754,709 | 7/1988 | Gramse et al. | 410/94 X |
| 4,854,791 | 8/1989 | Brown | 410/94 X |
| 5,017,066 | 5/1991 | Tylisz et al. | 410/94 X |
| 5,209,540 | 5/1993 | Metler | 105/370 X |

FOREIGN PATENT DOCUMENTS 1636290 3/1991 U.S.S.R. ............... 280/789

*Primary Examiner*—Karin L. Tyson
*Assistant Examiner*—F. Zeender
*Attorney, Agent, or Firm*—Locke Reynolds

[57] ABSTRACT

A chassis attachable to a fifth wheel of a tractor for hauling a freight container has a variable height gooseneck assembly for accommodating either a standard or a reduced tunnel depth freight container seatable on the chassis. The variable height gooseneck assembly includes a longitudinally extending gooseneck beam and a plate movable to a first position above the longitudinally extending gooseneck beam to support a standard tunnel depth freight container. A plate support element is movably connected to the plate and the longitudinally extending gooseneck beam, the plate support element being configured to move the plate to a second position that allows supported positioning on the gooseneck assembly of a reduced tunnel depth container.

7 Claims, 4 Drawing Sheets

VARIABLE HEIGHT GOOSENECK

BACKGROUND AND SUMMARY OF THE INVENTION

The present invention relates to a novel apparatus and method for support of transportable freight containers. More particularly, the present invention relates to a variable height chassis gooseneck that can be adjusted to accommodate differently sized containers.

Freight containers useful for transport by ship, rail, or overland trucking are commonly designed to comply with Marine (I.S.O.) or North American Domestic standards. These standards include provision of a narrow tunnel defined in a front bottom portion of a trailer. The depth of the tunnel must be 120 millimeters (4 23/32 inches) to allow proper fit of the tunnel over a narrow "gooseneck" portion of an overland trailer chassis. The gooseneck is raised higher than the remainder of the trailer chassis to permit its attachment by a conventional kingpin linkage to a fifth wheel of a truck cab. This arrangement permits reduction of the overall height (as measured from the ground) of the container to legal limits without reduction of inside height of the container.

In recent years, a new type of container commonly known as a "J. B. Hunt" container has become increasingly popular. This type of freight container has a reduced tunnel depth of only 3⅛ inches, permitting further increase in the inside height and a slightly narrower tunnel width permitting even further increase in volume of the freight container relative to standard freight containers. However, if one places these containers on a standard height gooseneck, the ground to top of freight container distance is prohibitively increased. In practice, these reduced tunnel depth containers can only be used with a specially designed trailer chassis having a low profile gooseneck. Since ensuring availability trailer chassis of differing configurations is inefficient, costly, and difficult, it would be advantageous to have a trailer chassis adjustable to support either standard or J. B. Hunt reduced tunnel depth freight containers.

The present invention provides a chassis attachable to a fifth wheel of a tractor for hauling a freight container, the chassis having a variable height gooseneck assembly for accommodating either a standard or a reduced tunnel depth freight container seatable on the chassis. The variable height gooseneck assembly includes a first longitudinally extending gooseneck beam and a plate movable to a first position above the longitudinally extending gooseneck beam to support a standard tunnel depth freight container. A plate support element is movably connected to the plate and the longitudinally extending gooseneck beam, with the plate support element being configured to move the plate to a second position that allows supported positioning on the gooseneck assembly of a reduced tunnel depth container.

In one preferred embodiment the plate support element is rotatably connected at a pivot to the longitudinally extending gooseneck beam to permit manual rotation of the plate from its first position to its second position. Conventionally, a gooseneck chassis has two longitudinally extending gooseneck beams positioned to lie in spaced apart, parallel relationship to each other. The plate support element is rotatably connected at a pivot positioned between these first and second longitudinally extending gooseneck beams to permit manual rotation of the plate from its first position to its second position. Additionally, if desired, the plate support element can include a supporting plate of increased width so that both the height and width is increased.

In another preferred embodiment of the present invention, the plate support element is vertically movable rather than rotationally pivoted between first and second positions. Typically, the plate support element includes a pneumatic drive mechanism for raising and lowering the plate. In certain embodiments, the pneumatic drive mechanism includes at least one inflatable tube positioned between the plate and the longitudinally extending gooseneck beam, with the inflatable tube being substantially deflated to bring the plate to its second position to support the reduced tunnel depth container and inflated to bring the plate to its first position to support the standard tunnel depth container.

Additional objects, features and advantages of the present invention will be apparent upon consideration of the following detailed description and accompanying drawings.

DETAILED DESCRIPTION OF THE INVENTION

Figure 1:
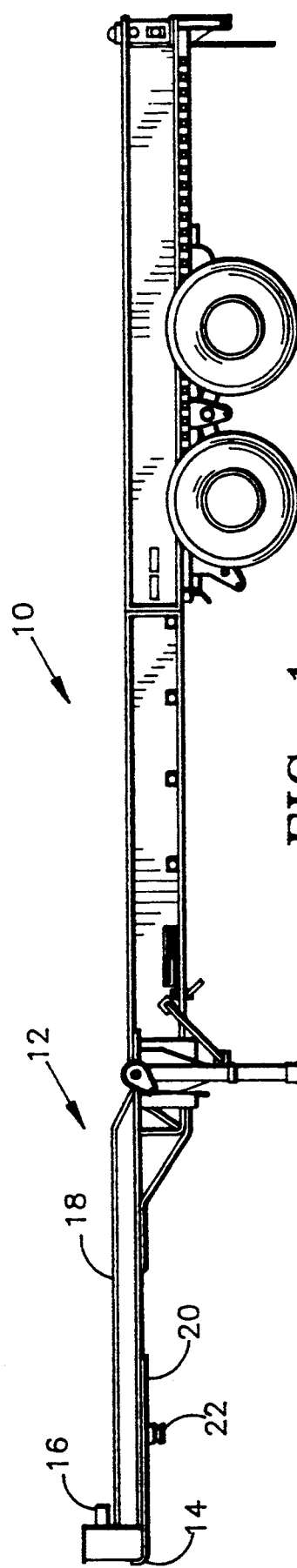
FIG. 1 is a side view of a container chassis having a gooseneck suitable for transport of both standard and reduced tunnel depth containers.
Figure 2:
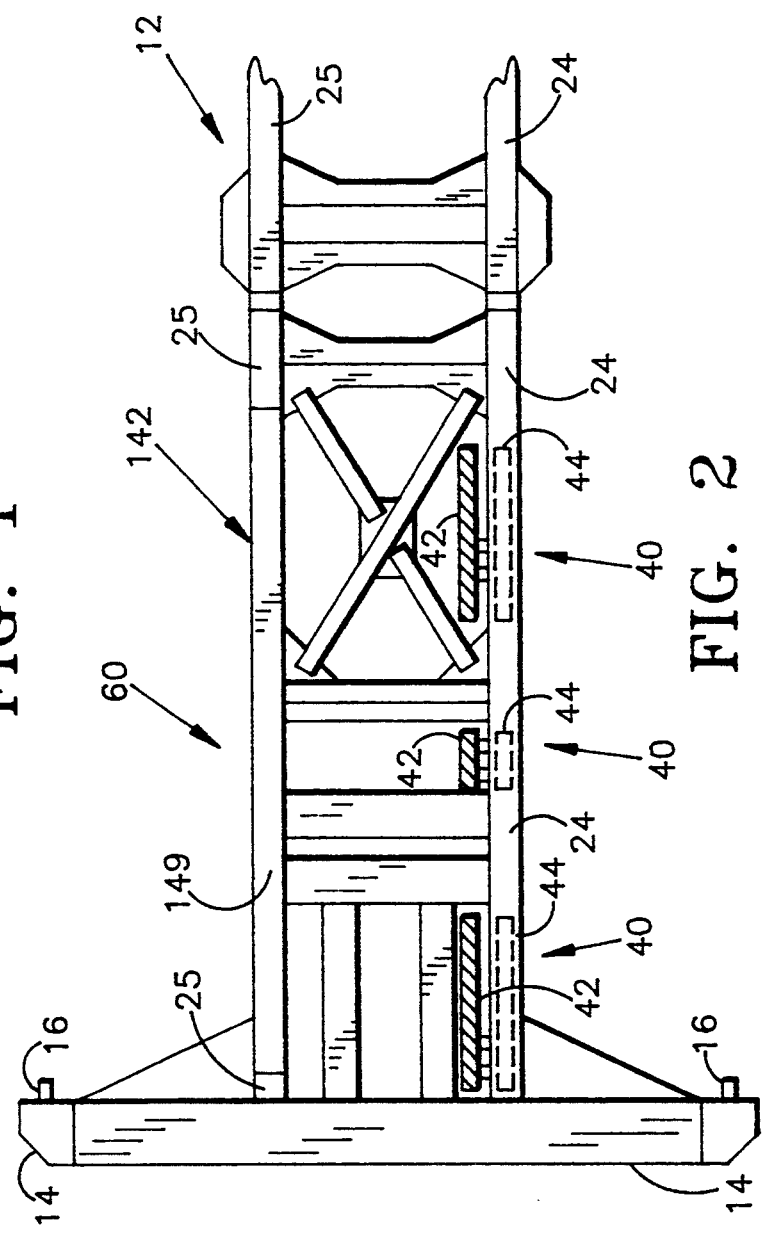
FIG. 2 is a top view of a container chassis such as illustrated in FIG. 1, with two gooseneck beams shown, and with one side of the chassis illustratively configured to have three pivotable plate support elements that can be swung from a position between the gooseneck beams to a position atop the gooseneck beam to support a standard tunnel depth container, and with the other side of the chassis illustratively configured to have a vertically movable plate support element liftable by pneumatic force applied with an inflatable tube.

A container chassis 10 attachable to semi-tractor trailers for hauling cargo containers is illustrated in side view in FIG. 1. The container chassis 10 is of conventional construction, and includes a forward gooseneck 12 connectable by kingpin attachment 22 to a semi-tractor trailer (not shown), the gooseneck having laterally extending arms 14 with couplers 16 to stably hold a cargo container (not shown). As best illustrated in FIG. 2, the gooseneck 12 has first and second gooseneck I-beams 24 and 25, the pair of I-beams being situated in spaced apart parallel relationship to each other. For illustration purposes, FIG. 2 is bifurcated by a dotted line, with opposite sides exhibiting differing mechanisms for gooseneck beam height adjustment in accordance with the present invention. In preferred embodiments, one or the other of the height adjustment mechanisms would normally be employed, not both as illustrated.

Figure 3:
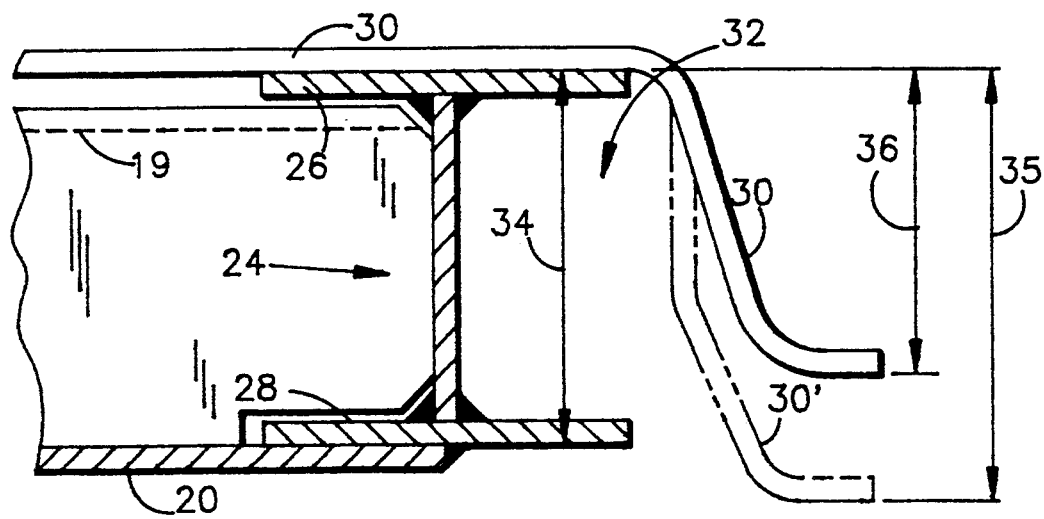
FIG. 3 is cross sectional view of a gooseneck beam of a chassis such as known in the prior art, showing a gooseneck beam ideally configured to support a reduced tunnel depth container (bold outline) and inappropriately support a standard tunnel depth container (phantom outline) so that it extends too close to the ground.
Figure 4:
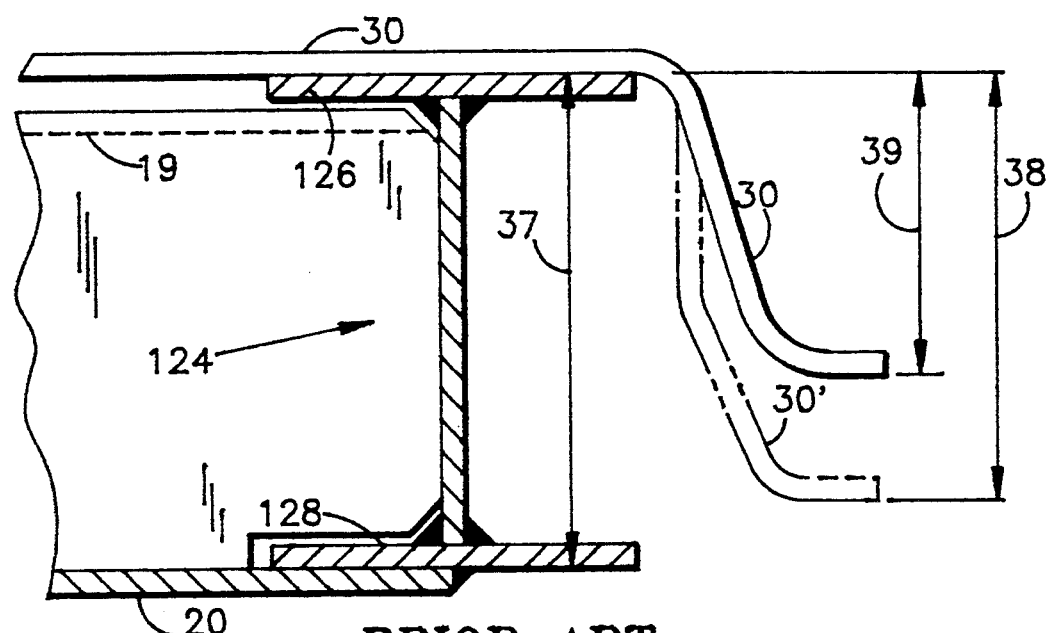
FIG. 4 is cross sectional view of a gooseneck beam of a chassis-such as known in the prior art, showing a gooseneck beam ideally configured to support a standard tunnel depth container (phantom outline) and inappropriately support a reduced tunnel depth container (bold outline) so that it extends inappropriately far vertically upward.

As illustrated in cross section in FIGS. 3 and 4, conventional gooseneck I-beams are not suitable for accommodating both standard tunnel depth and reduced tunnel depth containers. For example, in FIG. 3 the first gooseneck I-beam 24 has an upper flange 26 and a lower flange 28 that are respectively attached to support horizontal supports 19 for a lower plate 20 of the gooseneck 12. The first gooseneck I-beam 24 vertically spans a height 34 of about $3\frac{7}{8}$ inches, sufficient to support a reduced tunnel depth container bottom 30. The container bottom 30 has a reduced tunnel depth indicated by line 36, and is typically about $3\frac{1}{8}$ inches deep. However, when the first gooseneck I-beam 24 supports a standard tunnel depth container 30' (shown in phantom lines), the standard tunnel depth 35 of about 4 23/32 inches causes the bottom of the container to extend impermissibly low.

As shown in FIG. 4, use of greater height gooseneck I-beam 124 (with flanges 126 and 128) does not alleviate the problem of mismatched height. The gooseneck I-beam 124 vertically spans a height 37 of about 5 inches, sufficient to support a standard tunnel depth container bottom 30' (shown in phantom lines). The container bottom 30' has a standard tunnel depth indicated by line 38, typically about 4 23/32 inches deep. However, when the gooseneck I-beam 124 supports a reduced tunnel depth container 30, the standard tunnel depth 39 of about $3\frac{1}{8}$ inches causes the top of the container (not shown) to extend impermissibly high.

Figure 5:
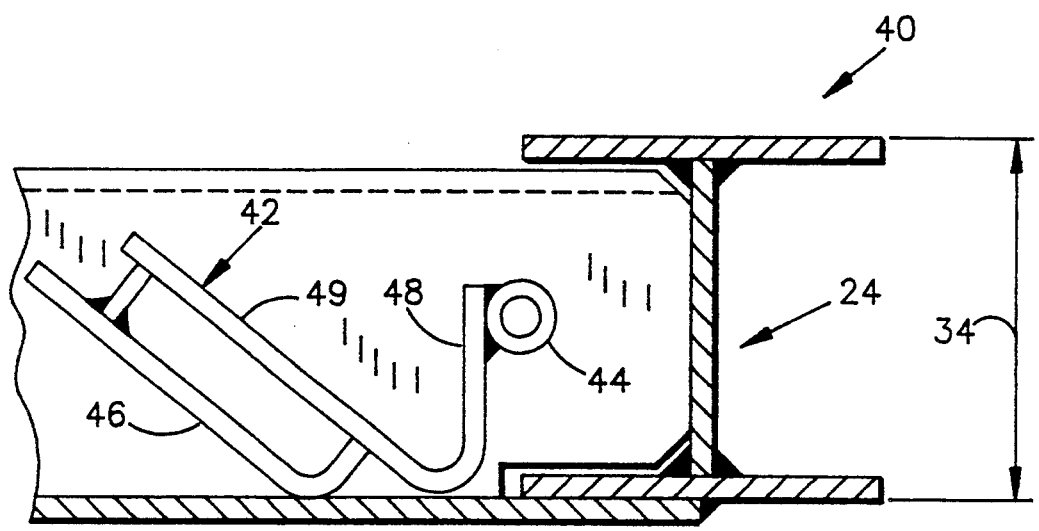
FIGS. 5 and 6 are cross sectional views of a pivotable plate support element that can be rotated from a position between the gooseneck beams, where the gooseneck beam can directly support a reduced tunnel depth container, to a position atop the gooseneck beam, where the combined height gooseneck beam and plate support element together support a standard tunnel depth container.
Figure 6:
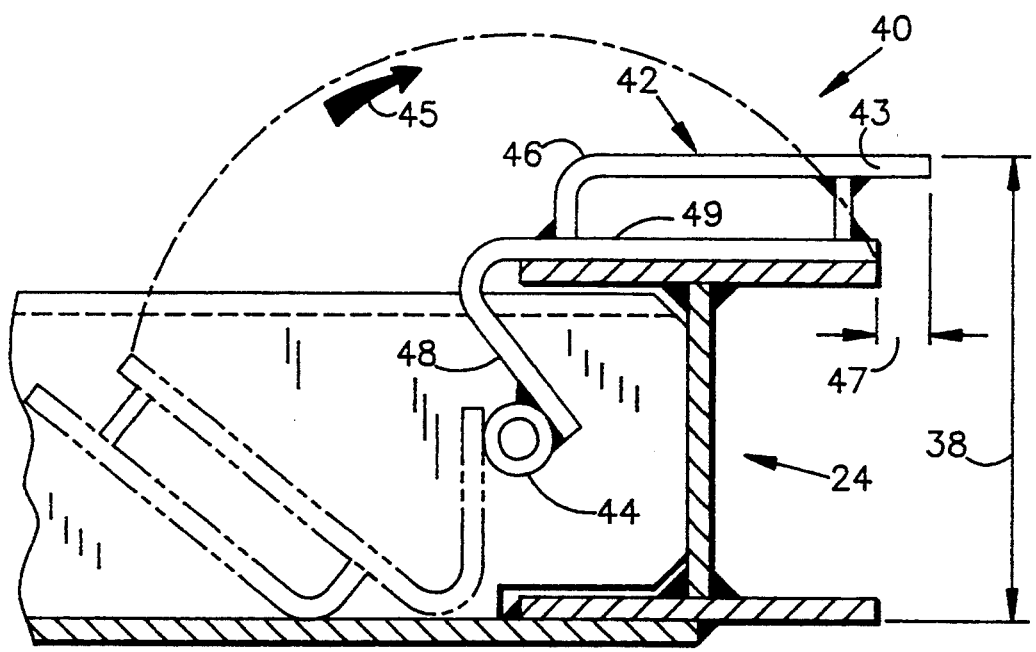

One way of correctly positioning a container is illustrated with reference to FIGS. 2, 5, and 6. An extendable height gooseneck assembly 40 having an extender 42 mounted on a pivot 44 connected to the reduced height gooseneck I-beam 24 is used to increase the effective height of the gooseneck I-beam 24. The extender 42 includes a lower plate 49 integrally attached at an angle to a limb 48. The extender height is determined by an appropriately sized J-shaped bracket supporting a plate 46 and attached to the lower plate 49. As best indicated in FIG. 6, the extender 42 can be rotated in the direction of arrow 45 from a position in between the gooseneck I-beams to a position atop I-beam 24. This effectively increases the height 34 (as indicated in FIG. 5) of the gooseneck I-beam to a height 38 (as shown in FIG. 6) of about 5 inches, positioning the plate 46 at a height suitable for supporting standard tunnel depth containers. The extended portion 43 of plate 46 effectively increases the width 47 (as indicated in FIG. 5) of the gooseneck I-beam to a width suitable for supporting standard tunnel width containers.

As those skilled in the art will appreciate, several pivotable extenders can be positioned along a gooseneck (such as illustrated in FIG. 2), or alternatively a single extender pivotably mounted at several positions can be utilized. In addition, double hinges or other suitable attachment mechanism are of course contemplated for the present invention. Movement of the extender 42 can be controlled manually or by suitable automatic mechanism as desired.

Figure 7:
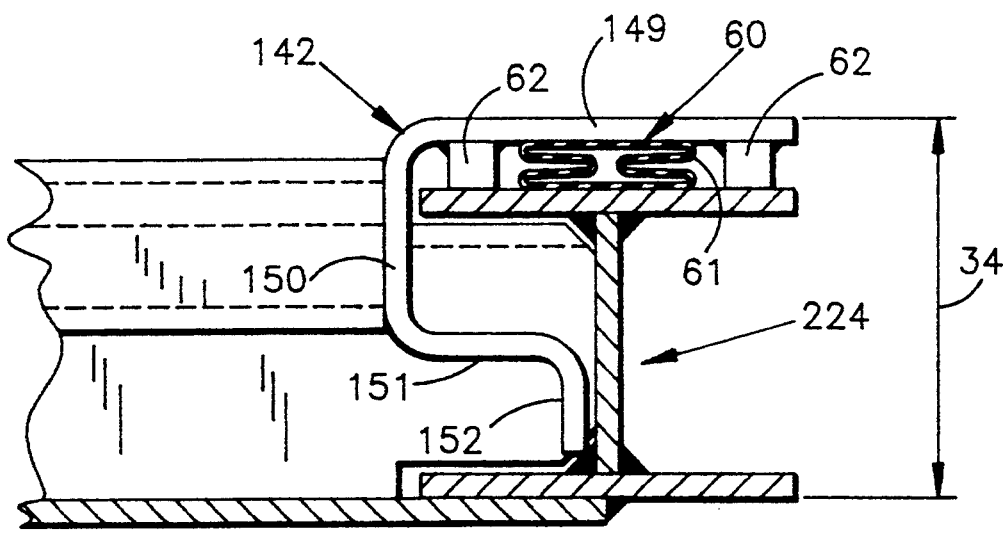
FIGS. 7 and 8 are cross sectional views of a vertically movable plate support element that is not rotated into position, but is instead vertically lifted by pneumatic inflation of a continuously extending inflatable tube positioned between the gooseneck beam and the plate support element, with FIG. 7 showing the inflatable tube deflated to allow support of a reduced tunnel depth container, and FIG. 8 showing the inflatable tube fully inflated to support a standard tunnel depth container.
Figure 8:
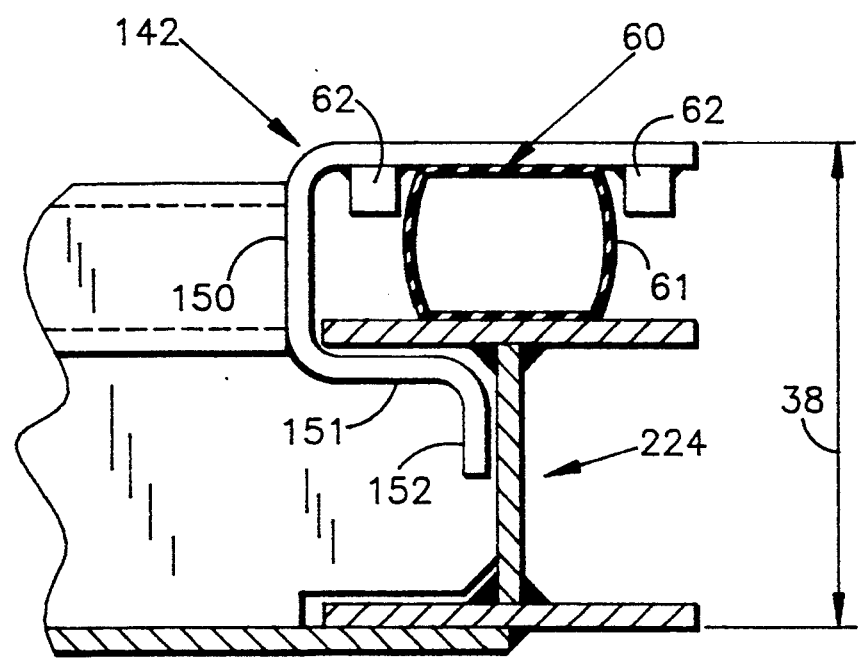

An alternative embodiment of the present invention that provides for direct vertical movement of a plate 149 is illustrated in FIGS. 2, 7 and 8. A pneumatic lift assembly 60 includes an inflatable pneumatic lift tube 61 that vertically moves extender 142 from a rest position such as shown in FIG. 7 to a raised position such as shown in FIG. 8. The extender 142 is integrally constructed from stamped metal to have a foot portion 152, leg portion 151, vertical body 150, and horizontal plate 149 that are sequentially connected to each other. The underside of the plate 149 further includes a pair of attached spacers 62 having the lift tube 61 positioned in between. In the rest position with the lift tube 61 deflated, the plate 149 of the extender 142 is supported by contact (by way of spacers 62) with a gooseneck I-beam 224. This provides an effective height 34 of about $3\frac{7}{8}$ inches, suitable for supporting reduced tunnel depth containers.

As shown in FIG. 8, when the lift tube 61 is inflated to support the plate 149, by connection with pneumatic lines in the semi-tractor trailer or other conventional inflation mechanisms, the extender 142 vertically moves upward to provide an effective height 38 of about 5 inches, suitable for standard tunnel depth containers. Further movement upward of the extender 142 is prevented by contact between the leg portion 151 and the I-beam 224. It will be appreciated by those skilled in the art that other conventional pneumatic or hydraulic lift mechanisms can be substituted for that illustrated, including hydraulic cylinders. In addition, purely mechanical ratchet, lever, or spacers can also be used instead of pneumatic lift mechanisms if desired.

While the present invention has been described in connection with specific embodiments, it will be apparent to those skilled in the art that various changes may be made therein without departing from the spirit or scope of the invention as defined in the following claims.

The claimed invention is:

1. A chassis attachable to a fifth wheel of a tractor for hauling a freight container, the chassis having a variable height gooseneck assembly for accommodating a standard tunnel depth freight container and a reduced tunnel depth freight container seatable on the chassis, the variable height gooseneck assembly comprising a pair of longitudinally extending gooseneck beams, plates movable by rotation about respective longitudinally extending axes positional between the longitudinally extending gooseneck beams from a first position above each of the longitudinally extending gooseneck beams to support the standard tunnel depth freight container to a second position that allows supported positioning on the gooseneck assembly of the reduced tunnel depth freight container, and plate support elements connected to the plates and positioned between the plates and the longitudinally extending gooseneck beams, the plate support elements being configured to move the plates by rotation about the respective longitudinally extending axes positioned between the longitudinally extending gooseneck beams from the first position to the second position.

2. The chassis of claim 1 further comprising a pivot rotatably connecting the plate support elements to the longitudinally extending gooseneck beams to permit manual rotation of the plates from the first position to the second position.

3. The chassis of claim 1, further comprising a plurality of plate support elements positioned along each of the pair of longitudinally extending gooseneck beams.

4. The chassis of claim 3, wherein each of the plate support elements continuously extends along its respective longitudinally extending gooseneck beam.

5. A chassis attachable to a fifth wheel of a tractor for hauling a freight container, the chassis having a variable height gooseneck assembly for accommodating a standard tunnel depth freight container and a reduced tunnel depth freight container seatable on the chassis, the variable height gooseneck assembly comprising first and second longitudinally extending gooseneck beams, a plate movable by rotation about a longitudinal axis positioned between the longitudinally extending gooseneck beams from a first position above one of the first and second longitudinally extending gooseneck beams to support the standard tunnel depth freight container to a second position that supports positioning on the gooseneck assembly of the reduced tunnel depth freight container, and a plate support element connected to the plate and one of the first and second longitudinally extending gooseneck beams, the plate support element being configured to permit manual movement of the plate by rotation about the longitudinal axis positioned between the longitudinally extending gooseneck beams from the first position to the second position.

6. The chassis of claim 5 wherein the plate support element is rotatably connected at a pivot positioned between the first and second longitudinally extending gooseneck beams.

7. A chassis attachable to a fifth wheel of a tractor for hauling a freight container, the chassis having a variable height gooseneck assembly for accommodating a standard tunnel depth freight container and a reduced tunnel depth freight container seatable on the chassis, the variable height gooseneck assembly comprising a longitudinally extending gooseneck beam, a plate movable by rotation about a longitudinal axis positioned between the longitudinally extending gooseneck beams from a first position above the longitudinally extending gooseneck beam to support the standard tunnel depth freight container to a second position that allows supported positioning on the gooseneck assembly of the reduced tunnel depth freight container, and means for moving the plate connected to the plate and the longitudinally extending gooseneck beam, the moving means being configured to move the plate by rotation about the longitudinal axis positioned between the longitudinally extending gooseneck beams from the first position to the second position.

* * * * *